United States Patent Office.

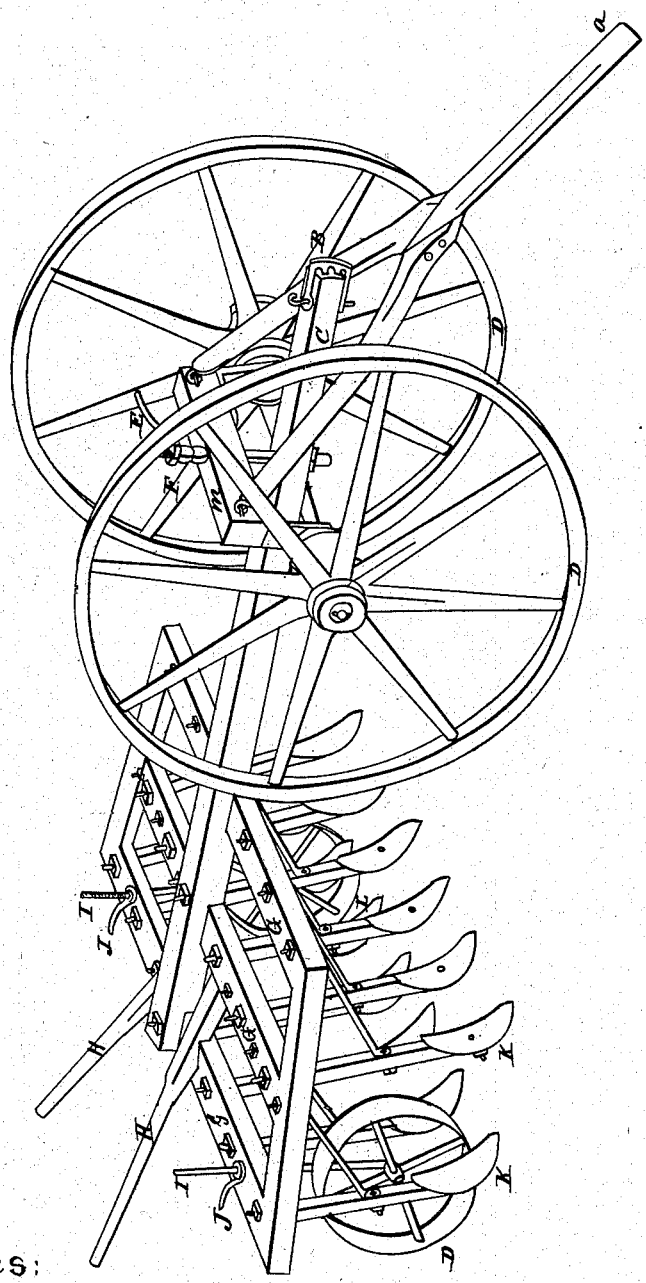

ANTON ROMANN AND JOHN PETERKA, OF WILTON, IOWA.

Letters Patent No. 68,114, dated August 27, 1867.

---

IMPROVEMENT IN COMBINED PLOUGH AND CULTIVATOR.

---

The Schedule referred to in these Letters Patent and making part of the same.

---

TO ALL WHOM IT MAY CONCERN:

Be it known that we, ANTON ROMANN and JOHN PETERKA, of Wilton, in the county of Muscatine, and State of Iowa, have invented a new and useful machine for ploughing and cultivating corn and other crops grown and cultivated in like manner, and also for harrowing, said machine being known, designated, and called the "Roman Cultivator and Harrow;" and we do hereby declare that the following is a full, clear, and exact description of the construction and operation of the same, reference being had to the annexed drawings, making a part of this specification.

A, the tongue or pole, to which the team is attached. B, the clevis, to which the whiffle-trees are attached. C, the beam connecting the forward running-gear with the cultivator proper. D, the large forward wheels. E, the lever, with a nut on the lower end fitting on the screw-bolt F, by turning which the beam C is raised and lowered. F, large screw-bolt, running through the beam C and axle M. M, a crooked axle, part wood and part iron, on which the wheels D run, and through which the screw-bolt F passes. G G G, three cross-bars, in the last or hindmost two of which the shovel-ploughs K K are set. H H, handles by which the machine is held and guided. I I, screw-bolts by which the small wheels L L are held and raised or lowered. J J, levers, with nut on the lower end fitting on the screw-bolts I I, and by turning which the small wheels L are regulated. K K, small shovel-ploughs, fastened in the cross-beams G by screws, nuts, and braces, in such a manner as to be readily taken out and replaced, In cultivating corn the two outside ploughs and the centre plough in the rear cross-bar G can be taken out, so as to allow the machine to pass directly over one row of corn. L L, small wheels, bearing a great part of the weight of the machine, and by raising or lowering which the depth of cultivation is regulated.

When the shovels rest on the surface of the ground, the beam C and the bars G are two feet from the ground. If it is desired to cultivate the soil deep, lower the beam C, by means of the screw F, and raise the small wheel L, by means of the screw I. If shallow cultivation is required, reverse this process. By proper adjustment of the screws the machine can be run on the wheels entirely, a convenience in going to or from the field. The rear bar G is seven feet long, and holds seven shovels K. The middle bar holds six shovels K.

When used as a harrow, all the shovels should be in. When used to cultivate corn or other like crop, the centre shovel in the rear bar should be removed, and the beam C and centre of the machine will pass directly over a row of corn, thus cultivating and ploughing the two spaces, each side of such row, at the same time.

What we claim as our invention, and desire to secure by Letters Patent, is—

The form and construction of the cultivator and harrow combined, when arranged, adjusted, and operated with the bolt F, beam C, and axle M, as attached to the frame or bars G, with the regulating wheels L, as herein described and for the purposes set forth.

ANTON ROMANN,
JOHN PETERKA.

Witnesses:
AARON PARK,
DAVID MOORE.